UNITED STATES PATENT OFFICE.

OTTO KLIMMEK, OF CHICAGO, ILLINOIS, ASSIGNOR OF ONE-HALF TO ALBERT E. PALMER, OF SAME PLACE.

OXYETHYLACETANILID.

SPECIFICATION forming part of Letters Patent No. 606,288, dated June 28, 1898.

Application filed September 18, 1897. Serial No. 652,176. (Specimens.)

*To all whom it may concern:*

Be it known that I, OTTO KLIMMEK, a citizen of the United States, residing at Chicago, in the county of Cook and State of Illinois, have invented certain new and useful Improvements in Medicinal Compounds and in the Methods of Preparing the Same; and I do declare the following to be a full, clear, and exact description of the invention, such as will enable others skilled in the art to which it appertains to make and use the same.

This invention relates to an improvement in medicinal compounds and to the process by which the same is prepared.

The new product is a febrifuge, diaphoretic and analgesic, and is prepared from paraamidophenetol.

In carrying out the process of manufacture I add to the paraämidophenetol one molecule of glacial acetic acid. The mass is placed in a flask having a return-condenser and maintained at a temperature of 100° centigrade in a water-bath for from four to five hours. This solution is then thrown into eighty parts of boiling water and maintained at the boiling-point for a few minutes, a sufficient quantity of animal charcoal having been added to secure on filtration a perfectly clear liquid. The solution is now filtered while hot and allowed to crystallize rapidly. The large volume of water above mentioned thoroughly dissolves the solids, so that all of the impurities and coloring-matter are absorbed by the charcoal. The resulting product, oxyethyl-acetanilid, having the formula $C_{10}H_{13}NO_2$ (1:4), after being separated from the water is a solid composed of very small lustrous crystals taking the form of scales. It is white, very light and "fluffy," soft or velvety to the touch, and is tasteless. It is almost insoluble in cold water. In boiling water when agitated it dissolves readily. Tested with nitric acid it assumes a marked yellow, changing to an orange color, depending upon the amount of acid and heat applied. The substance crystallizes very finely, thereby presenting great surface area, and hence it is readily dissolved and when taken into the stomach promptly acted upon and quickly absorbed.

I claim as my invention—

1. The product, oxyethylacetanilid, herein described, having the formula $C_{10}H_{13}NO_2(1:4)$, and the following characteristics: it is white, very light, fluffy and velvety, and has lustrous scale-crystals, and on the application of nitric acid assumes a marked yellow, changing to an orange color, depending upon the amount of acid and heat applied.

2. The herein-described process of making oxyethylacetanilid from paraämidophenetol, consisting in heating therewith equal molecules of glacial acetic acid continuously in a water-bath, then dissolving the mass in approximately eighty parts of boiling water, with the addition of animal charcoal, then filtering and crystallizing out the solid.

In testimony whereof I affix my signature in presence of two witnesses.

OTTO KLIMMEK.

Witnesses:
LOUIS K. GILLSON,
HESTER BAIRD.